Nov. 24, 1964 D. A. STRIEF 3,158,752

FREQUENCY SPECTRUM GENERATOR UTILIZING DIODE AND RC COMBINATION TO EFFECT AMPLIFICATION AND HARMONIC GENERATION

Filed May 1, 1961

INVENTOR.
DEAN A. STRIEF
BY Alden D. Redfield
Irwin P. Garfinkle
ATTORNEYS.

3,158,752

FREQUENCY SPECTRUM GENERATOR UTILIZING DIODE AND RC COMBINATION TO EFFECT AMPLIFICATION AND HARMONIC GENERATION

Dean A. Strief, Cincinnati, Ohio, assignor to Avco Corporation, Cincinnati, Ohio, a corporation of Delaware Filed May 1, 1961, Ser. No. 106,904
4 Claims. (Cl. 307—88.5)

This invention relates to a frequency spectrum generator, and more particularly to semi-conductive circuitry for summing two stable frequencies to produce a relatively wide spectrum maintained essentially at a uniform amplitude, the signals being harmonically sequential about the first frequency but related directly to the second.

The requirements for a practical station selector system for single side band communication equipment posed the need for a clock reference multiple signal generator having an output comprising a series of signals spaced a specified channel width and having an amplitude maintained essentially at a uniform level throughout the spectrum of operation. In a practical embodiment it was necessary to generate 40 frequency stable sine wave or pulse-type signals with amplitudes varying no more than 2 db. Many systems are known to the prior art for producing waves rich in harmonics. However, all of the known prior arts fail to provide the stable, broad, and uniform signal spectrum that was required. The simple transistorized circuitry, which includes a signal modulator, a wave-shaping amplifier, and a filter, used in a preferred embodiment of this invention reliably performed the required functions of a multiple signal reference clock, and results considerably in excess of the system requirements were achieved.

The primary object of this invention is to provide a source of uniform amplitude signals over a broad signal spectrum.

Another object of this invention is to generate a series of harmonics which may then be diode amplified to produce a spectrum in which the amplitudes are relatively constant over a wide frequency range.

Still another object of this invention is to supermodulate a relatively weak carrier frequency signal with a strong modulation signal and to saturably drive semi-conductive circuitry with the combined signals to generate a sequential chain of uniform level side bands spaced at the modulation frequency.

For better understanding of the precise nature and other objects of this invention, reference should now be made to the following detailed specification and to the accompanying drawing in which.

Figures 1, 2:
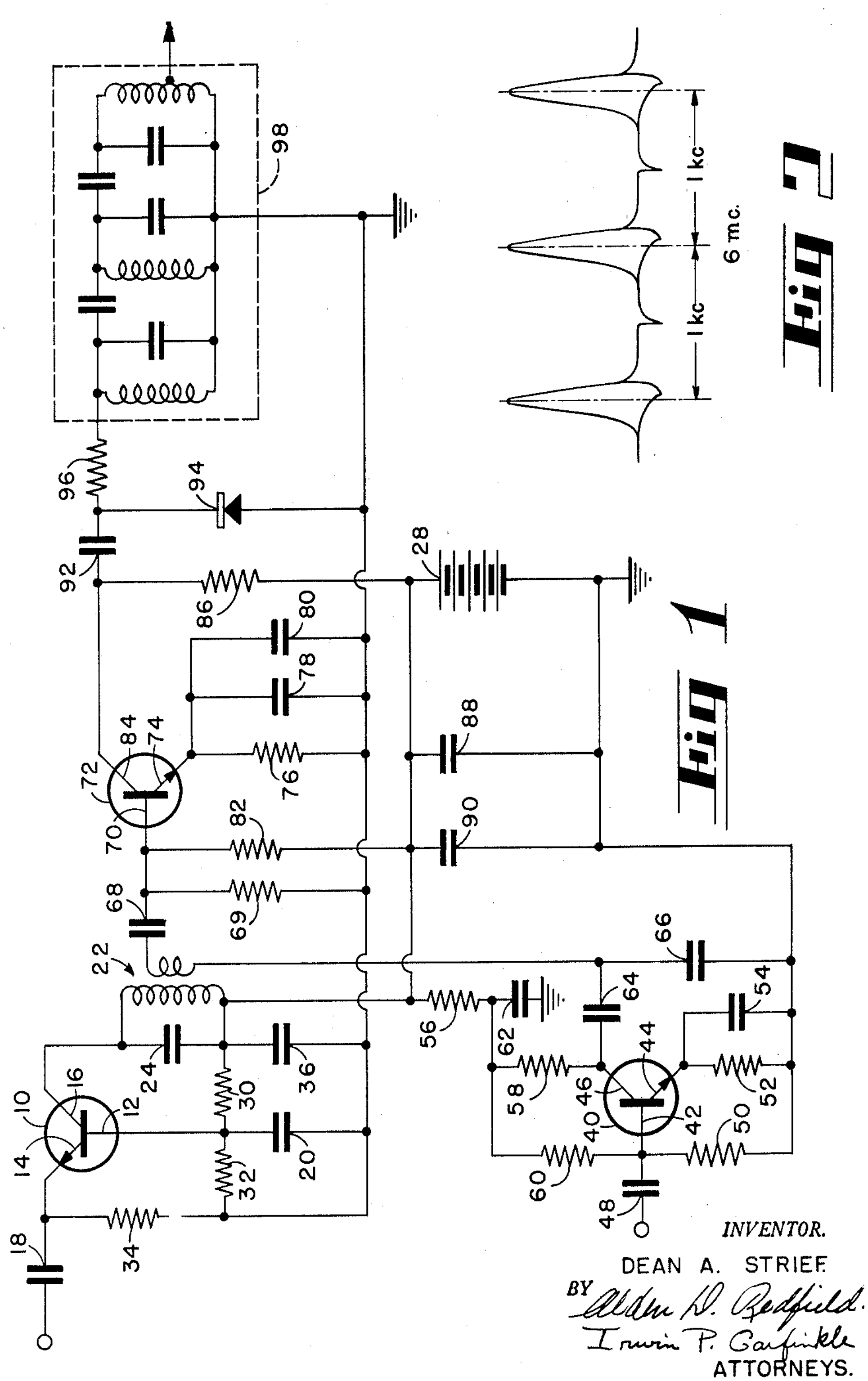
FIG. 1 represents a preferred embodiment of this invention.
FIG. 2 is a series of curves illustrating the performance of this invention.

For the sake of clarity in describing the preferred embodiment, reference will be made to the actual frequencies used in apparatus as reduced to practice. However, it will be understood that the invention is in no way limited to these frequencies and that any other carrier or modulation frequencies may be used, depending upon the particular system requirements. The apparatus illustrated in FIG. 1 was designed to produce a sequential chain of side bands spaced 1 kilocycle on either side of a 6 megacycle carrier.

The 6 megacycle carrier frequency signal is first amplified in a transistor amplifier 10 having a base 12, an emitter 14, and a collector 16. The 6 megacycle signal is applied to the emitter 14 through a capacitor 18, the base 12 being connected to ground for alternating currents by means of a capacitor 20, and the alternating current output from the transistor amplifier 10 being derived at the collector 16 through a transformer 22 tuned by a capacitor 24. Direct current biasing for the electrodes of transistor amplifier 10 is provided from a battery 28 through resistors 30, 32, and 34. The blocking capacitor 36 provides an alternating current path to ground.

For producing a spectrum of signals centered at the 6 megacycle frequency with 1 kilocycle spacings, I amplify a 1 kilocycle signal by means of a transistor 40 having a base 42, an emitter 44, and a collector 46, the 1 kilocycle signal being applied to the base 42 through capacitor 48. The base of transistor 40 is connected to ground through a resistor 50, while the emitter is connected to ground through a resistor 52 and a parallel-connected capacitor 54. Direct current collector bias is supplied from the battery 28 through resistors 56 and 58 and to the base through a resistor 60, the condenser 62 providing an alternating current by-pass. The amplified 1 kilocycle signal is derived at the collector 46 and applied through a condenser 64 to the junction of the secondary of the transformer 22 and a capacitor 66 to effectively combine the 1 kilocycle and 6 megacycle signals in series.

The combined 6 megacycle and 1 kilocycle signals are applied through a condenser 68 across a resistor 69 and to the base 70 of a transistor 72, the emitter 74 of which is connected to ground through a resistor 76 and through parallel-connected condensers 78 and 80. Direct current bias for the base 70 is provided from the battery 28 through a resistor 82, while bias for the collector 84 is provided through a resistor 86, the direct current blocking condensers 88 and 90 providing an alternating current by-pass to ground. The output from the transistor 72 is derived from the collector 84 through condenser 92 and a wide spectrum of harmonics is developed across the diode 94. A particular frequency is selected at resistor 96 by means of a filter network 98. The diode 94, per se, forms no part of this invention, but serves to eliminate unwanted spikes appearing at the output. The capacity of diode 94 must be considered in selecting parameters for the filter 98.

In operation, when the amplified 6 megacycle signal is combined with the amplified 1 kilocycle signal derived from the collector of transistor 40, the signals are then applied in series across the base-emitter junction of the transistor 72. The amplitude of the 1 kilocycle modulation signal is sufficient to drive that transistor into saturation; i.e., to clip the peaks of the applied signals. The output derived from the collector 84 of transistor 72 and applied across the diode 94 contains a harmonic spectrum of frequencies centered at 6 megacycles with 1 kilocycle spacings.

FIG. 2 illustrates a typical output envelope which contains 20 harmonics and the carrier frequency whole amplitudes are approximately equal. The carrier frequency was 6 megacycles and the modulating frequency was at 1 kilocycle. In one system reduced to practice, approximately 40 such harmonics were required and generated, and while the amplitude remained essentially constant (within 2 db), there was some slight reduction in the width of the envelope, and thus there was some loss of power.

Ordinarily the application of a signal of any particular frequency to a saturated amplifier would result in the production of a wave rich in harmonics and a particular harmonic could be selected by an appropriate filter. However, the harmonic removed from the center frequency will be reduced in amplitude. In this case, however, the application of the 1 kilocycle and 6 megacycle signals to the base emitter diode junction of transistor 72 results in a diode amplifier action having a response which is an inverse function of the amplitude level of the harmonics as the frequency moves off center. This diode amplifier action results from the application of the 6 megacycle carrier signal supermodulated by the 1 kilocycle signal across the base and emitter junction and across the resistor 76 and the parallel-connected condensers 78 and 80.

While a transistor 72 has been used in this preferred embodiment, it will be understood that similar results could be obtained by using any semi-conductor diode junction useful in diode amplifiers. However, using the diode junction of a transistor gives the advantage of a stage of linear amplification in addition to the non-linear diode amplification which tends to make the amplitude level of the harmonic spectrum uniform.

For the purpose of facilitating the construction of this invention by persons skilled in the art, the parameters used in a system actually reduced to practice are reproduced below. It should be understood, however, that these parameters are by way of example and should not be construed as limiting the invention in any way.

| | |
|---|---|
| Transistor 10—Type 2N706 | Capacitor 90—30 $\mu$f. |
| Transistor 40—Type 2N706 | Capacitor 92—.0033 $\mu$f. |
| Transistor 72—Type 2N706 | Transformer 22—3.9 $\mu$h. primary |
| Diode 94—Type 1N270 | Resistor 30—8.2K ohms |
| Capacitor 18—.01 $\mu$f. | Resistor 32—2.2K ohms |
| Capacitor 20—.01 $\mu$f. | Resistor 34—470 ohms |
| Capacitor 24—180 $\mu\mu$f. | Resistor 50—1K ohm |
| Capacitor 48—33 $\mu$f. | Resistor 52—100 ohms |
| Capacitor 54—100 $\mu$f. | Resistor 56—100 ohms |
| Capacitor 62—33 $\mu$f. | Resistor 58—1K ohm |
| Capacitor 64—10 $\mu$f. | Resistor 60—8.2K ohms |
| Capacitor 66—.0033 $\mu$f. | Resistor 69—2.2K ohms |
| Capacitor 68—.1 $\mu$f. | Resistor 76—220 ohms |
| Capacitor 78—25 $\mu$f. | Resistor 82—33K ohms |
| Capacitor 80—.004 $\mu$f. | Resistor 86—1.5K ohms |
| Capacitor 88—.02 $\mu$f. | Resistor 96—1K ohm |

Having thus described a preferred embodiment of this invention, what is claimed is:

1. In a generator for producing signals having a relatively wide spectrum of harmonic frequencies sequentially spaced from a given carrier frequency at intervals equal to a given modulation frequency, the combination comprising: a high frequency carrier source; a relatively low frequency modulation source; means for supermodulating said high frequency carrier source with signals from said low frequency modulation source; a solid state semiconductor device including a forward-biased diode junction; a resistive and capacitive load circuit; means connecting said supermodulated source in circuit with said device and said resistive and capacitive load circuit for saturably driving said diode junction, and means for deriving from across said device and said load a wide spectrum of harmonics, said spectrum being centered at said carrier frequency and spaced at intervals equal to said modulation frequency and having a relatively constant amplitude over a wide range.

2. The invention as defined in claim 1 wherein said diode junction comprises the junction of the base and emitter of a transistor amplifier.

3. In a generator for producing signals having a relatively wide spectrum of harmonic frequencies sequentially spaced from a given carrier frequency at intervals equal to a given modulation frequency, the combination comprising: a source of carrier frequency signals; a source of modulation frequency signals; means for supermodulating said carrier frequency signals with said modulation frequency signals; a transistor amplifier having base, emitter, and collector electrodes; a resistive and capacitive load circuit including a parallel-connected resistor and capacitor, said load circuit being connected to said emitter; means for connecting said supermodulated signals across the base and emitter electrodes of said transistor and said load circuits in series for driving said transistor into saturation; and means for deriving amplified harmonic frequencies from the collector of said transistor, said harmonics being centered at said carrier frequency and being spaced at intervals equal to said modulation frequency and having a relatively constant amplitude over a wide frequency range.

4. In a generator for producing signals having a relatively wide spectrum of harmonic frequencies sequentially spaced from a given carrier frequency at intervals equal to a given modulation frequency, the combination comprising: a source of relatively high frequency carrier signals; a source of relatively low frequency modulation signals; a transistor amplifier, said transistor having base, emitter, and collector electrodes; a two-terminal source of direct currents; a first resistor and a condenser connected in parallel between said emitter electrode and one of said terminals, a second resistor connected between said base electrode and said other terminal, and a third resistor connected between said collector electrode and said other terminal whereby said collector electrode is reversely biased and said emitter and base electrodes are forwardly biased for transistor operation; means for supermodulating said high frequency carrier signals with said low frequency modulation signals; means applying said supermodulated signals between said base electrode and said one terminal for driving said transistor into saturation, whereby a wide range of harmonic frequencies centered at said carrier frequency and spaced at intervals equal to said modulation frequency having amplitudes which are relatively constant over a wide range are produced at said collector electrode.

References Cited by the Examiner

UNITED STATES PATENTS

| | | | |
|---|---|---|---|
| 2,666,816 | 6/54 | Hunter | 307—88.5 X |
| 2,813,200 | 11/57 | Heber | 328—16 |
| 2,978,576 | 4/61 | Waters | 325—451 X |
| 3,007,045 | 10/61 | Paynter | 325—451 |

ARTHUR GAUSS, *Primary Examiner.*

JOHN KOMINSKI, *Examiner.*